United States Patent
Balasubramanian et al.

(10) Patent No.: US 6,646,762 B1
(45) Date of Patent: Nov. 11, 2003

(54) GAMUT MAPPING PRESERVING LOCAL LUMINANCE DIFFERENCES

(75) Inventors: Thyagarajan Balasubramanian, Webster, NY (US); Ricardo L. de Queiroz, Pittsford, NY (US); Karen M. Braun, Henrietta, NY (US); Reiner Eschbach, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/435,308

(22) Filed: Nov. 5, 1999

(51) Int. Cl.$^7$ ............................................. G06F 13/00
(52) U.S. Cl. ........................................ 358/1.9; 358/515
(58) Field of Search ..................... 358/1.9, 518, 519, 358/520, 3.24, 515, 517, 521, 525, 537; 382/167, 260, 261

(56) References Cited

U.S. PATENT DOCUMENTS

| | | | | |
|---|---|---|---|---|
| 5,012,333 A | * | 4/1991 | Lee et al. ................... | 358/520 |
| 5,450,216 A | | 9/1995 | Kasson ....................... | 358/518 |
| 5,579,031 A | | 11/1996 | Liang ......................... | 345/154 |
| 5,608,824 A | * | 3/1997 | Shimizu et al. ............. | 382/276 |
| 5,883,632 A | | 3/1999 | Dillinger .................... | 345/431 |
| 5,903,275 A | | 5/1999 | Guay ......................... | 345/430 |
| 6,198,843 B1 | * | 3/2001 | Nakauchi et al. ........... | 358/518 |
| 6,421,142 B1 | * | 7/2002 | Lin et al. ..................... | 358/1.9 |

OTHER PUBLICATIONS

T. Morimoto et al, "Objects' Color Matchings Based on Image Clustering"; Japan Hardcopy '98, p. 371ff.
R.S. Gentile et al; "A Comparison of Techniques for Color Gamut Mismatch Compensation"; Journal of Imaging Technology, vol. 16, No. 5, Oct. 1990 p. 176–181.
Edward G. Pariser; "An Investigation of Color Gamut Reduction Techniques" ;Published for the IS&T's Second Symposium on Electronic Prepress Technology and Color Proofing held on Sep. 11–13, 1991.

* cited by examiner

*Primary Examiner*—Mark Wallerson
(74) *Attorney, Agent, or Firm*—Mark Costello; Mark Z. Dudley

(57) ABSTRACT

A color printing process, printing a color image in which out-of-gamut original colors are present. For each pixel defined by an original color which is determined to be out of gamut, a gamut remapping process is applied to map each pixel to a color which is within a printer gamut, remapping said pixels to colors within an output printer gamut. For a given set of gamut remapped pixels, gamut remapped pixel colors are compared with said original pixel colors, to derive a comparison metric. Using the comparison metric, a corrected set of gamut remapped colors is generated. The comparison metric may be subjected to an adaptive filtering process, which strengthens the comparison metric in high frequency image regions to increase its impact on the gamut remapped colors, and weakens the comparison metric in low frequency areas, to weaken its impact on the gamut remapped colors.

16 Claims, 6 Drawing Sheets

GAMUT MAPPING PRESERVING LOCAL LUMINANCE DIFFERENCES

CROSS REFERENCE

Cross-reference is made to concurrently filed patent application Ser. No. 09/435,256 entitled, "Gamut Mapping Preserving Local Luminance Differences with Adaptive Spatial Filtering", by R. Balusubramanian, R. de Queiroz, R. Eschbach and Wengchen Wu.

The present invention is directed to improving the selection of printer colors where the original document selects colors that are out of gamut, and more particularly to an out of gamut mapping method that preserves spatially local luminance differences.

BACKGROUND OF THE INVENTION

Printing devices and display devices all inherently have a region of operation, sometimes referred to as a gamut. Because such image reproduction devices are non-ideal, they cannot reproduce every possible color that can be seen by a human. Gamut mapping is often used because the color range that is possible to reproduce with a particular display is commonly not identical with the color range possible to reproduce with any selected printer. Thus, while both display and printer have a large number of colors that are reproducible by both, there may be certain combinations of sets of color values that are outside the reproduction capability of one or the other. However, images are composed for printing on display devices, and users expect printers to reproduce images with their intent. Furthering the problem, different printing technologies and materials inherently provide different gamuts even among each class of devices.

Gamut mapping serves to map pixels defined by colors not printable by the printer or resulting from initial image processing, into colors printable by a real printer. In doing so, out-of-gamut, unprintable colors are mapped to printable colors in accordance with some scheme designed to maintain color intent and aesthetic appearance. One of the most common schemes is to map any out-of-gamut pixel to its closest in-gamut neighbor. Obviously this is not satisfactory, because in a region of slight color variation, that is outgamut, a number of similar colors may be mapped to the same in-gamut color. Some textures, highlights and shadows in an original image will be lost.

This problem leads to a generalization that a fundamental problem of traditional gamut mapping processes is that they are pixelwise operations that do not take neighborhood effects into account. Looking at one example, illustrated at FIG. 1, when blue text is placed against a black background, the original monitor or display has no difficult in providing an image that clearly distinguishes the blue and black regions. However, the highly saturated blue color may be out of gamut of some printers, and black is commonly mapped to the printer's blackest reproduction. For large area reproduction, this maybe entirely acceptable. However, with the colors juxtaposed, looking at a luminance profile as in FIG. 2, the luminance difference is decreased dramatically, rendering the appearance difference on the printed page problematic.

In another example, shown in FIG. 3, a saturated red/green edge that has been processed with JPEG compression and decompression, results in an intermediate yellow color produced at the edge. The stripe of yellow color is not readily visible, however, when its luminance matches its green neighbor. However, as illustrated in FIG. 4, gamut mapping applied to the red/green edge will tend to decrease the luminance of the green side of the edge, while allowing the yellow, which is within gamut, to print at its same luminance level, thus rendering it much more apparent and objectionable.

A similar problem occurs in antialiasing, where edge softening of saturated color edges results in printable colors, and inconsistent out-of-gamut mapping of the saturated colors causes the softened edge to stand out from the background and foreground colors.

U.S. Pat. No. 5,579,031 to Liang describes the use of a printer model in the calibration, where the model is iteratively updated to form a final LUT. While the use of a transform like the LUT described in itself inherently provides color matching between the two devices considered, additional color gamut mapping may be used in the development of the LUT, by performing a preselected mathematical manipulation that maps the input set of color values to lie within the range of values from the printer model. Such mathematical manipulation may be as simple as truncation or as complicated as data compression.

U.S. Pat. No. 5,883,632 to Dillinger describes preservation of relative position by geometric transform on "hue pages". Device-space color specifications for two color presentation devices are interrelated through the intermediary of at least one perceptual color space. This interrelation is performed by either tabulations or real-time software processing, and in such a way that color, and color changes, specified in relation to one device—in a control language of that device—are tracked in both the language and the actual performance of the other device. This mapping through perceptual space can be used to produce the effect of matching the two device gamuts to each other, so that the full gamuts of both are in effect merged. When so used, this new kind of mapping preserves relative positions in color space—and thus the capability of the tracking device to maintain distinctions between colors seen on the source/input device that appear very closely similar. Such discrimination between adjacent colors can be supported essentially throughout the gamut of both devices and in particular even very near the lightness extrema and maximum-saturation point on a hue page.

An article by T. Morimoto et al, "Objects' Color Matchings Based on Image Clustering" (Japan Hardcopy '98 p. 371ff), teaches image segmentation and color mapping for the different objects.

U.S. Pat. No. 5,903,275 to Guay describes a gamut mapping in which saturated colors (i.e., out of gamut colors) are mapped to device saturated values (device printable saturated colors). Colors inside the gamut are mapped to "closest" and other colors to a blend between closest values calorimetrically and saturation. First, the printable colors are measured is some device independent color space, such as L*a*b*. Next, the range of colors from some reference color CRT, consisting of the colors from black to monitor saturates, and the colors between, then from saturates to white, and the colors between, are calculated. The saturates are assigned colors based on what printable color a user would like to get when the user asks for a saturated CRT color. This gives the printer's representation of the outer range of the color gamut of the CRT. Next, a table is generated that subsamples all colors available to the specified color space. This table fills in entries within the color gamut of the target printer with the closest printable color. Colors out of the printer's gamut are represented by an averaging of the printable colors and of the outer range of colors assigned for the saturates. A requested color is converted to the reference color space, then looked up in the table, and the resulting color specification is sent to the printer.

U.S. Pat. No. 5,450,216 to Kasson describes gamut-mapping color images in device-independent form to device-dependent gamut in a perceptual color space. Digital images are mapped to any device-dependent gamut in a manner that minimizes the human visual response both to the luminance and the chrominance changes necessary to force out-of-gamut pixels into the specified device-dependent gamut. A "neighborhood gamut mapping" technique considers the subjective visual effects of nearby pixels on the mapping of each pixel. At low spatial frequencies, image luminance is biased toward the luminance in the device-dependent gamut at which the greatest chroma magnitude is available for a fixed hue angle. Spatial filtering exploits the differing spatial frequency regions of insensitive human visual response to both luminance and chrominance changes.

The references cited herein are incorporated by reference for their teachings.

SUMMARY OF THE INVENTION

In accordance with the present invention there is provided a method of gamut mapping that preserves variations in color within a local neighborhood of pixels in the image.

In accordance with one aspect of the invention, there is provided a method of remapping out-of-gamut colors in an original document, preparatory to use in a system having a different system gamut including: receiving a set of pixels defining at least a portion of an image, each pixel mapped to an original pixel color; for any pixel in said set of pixels, remapping said pixel from said original color to a color which is within said system gamut; comparing colors in said set of pixels before remapping with colors of said set of pixels after remapping and creating a comparison metric therefrom; and applying said comparison metric to said colors after remapping to provide corrective feedback to said pixel set for final color selection within said system gamut.

In accordance with another aspect of the invention, the comparison metric is filtered with a spatial filter prior to said applying step. The spatial filter is selected to strengthen the comparison metric in high frequency image regions to increase its impact on the gamut remapped colors, and weaken the comparison metric in low frequency areas, to weaken its impact on the gamut remapped colors.

It is an important aspect of the present invention that the mapping from an input color to an output color is not a unique mapping as done in standard gamut mapping techniques. Rather the mapping of an individual color depends on its local neighborhood. This means that a specific color will be mapped to different output colors as a function of neighboring colors.

The present invention seeks to preserve spatially local luminance variations in the original image, by calculating the difference between the original image luminance and the gamut mapped luminance resulting from using a pixel-bases gamut mapping process. A spatial filter is then applied to the difference signal, and the signal is added back to the gamut-mapped signal. The result is a reduction of the artifacts that arise from standard gamut mapping algorithms.

The invention may take form in various components and arrangements of components, and in various steps and arrangements of steps. The drawings are only for purposes of illustrating a preferred embodiment and are not to be construed as limiting the invention:

Figure 1:
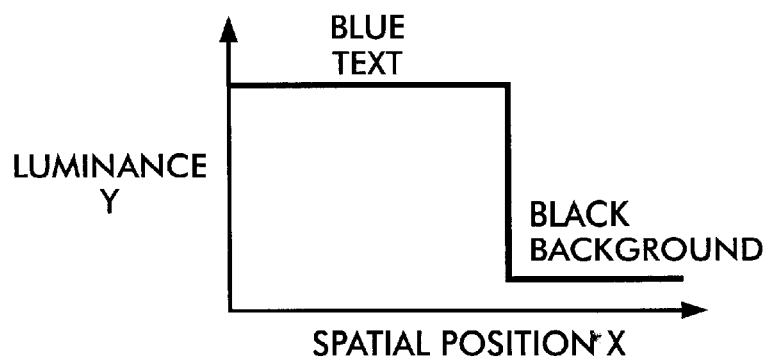
FIGS. 1, 2, 3 and 4 illustrate artifacts generated by out of gamut processing.
Figure 2:
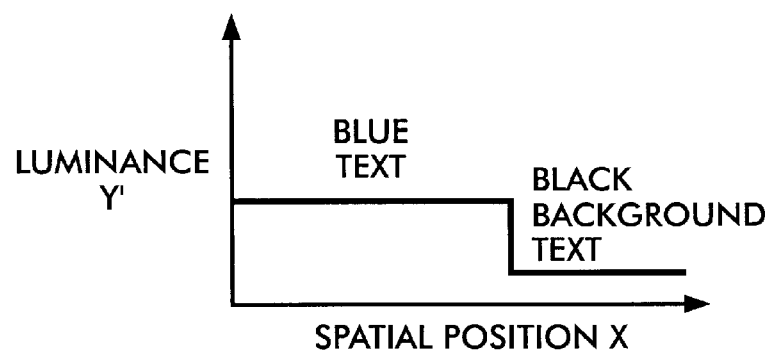
Figure 3:
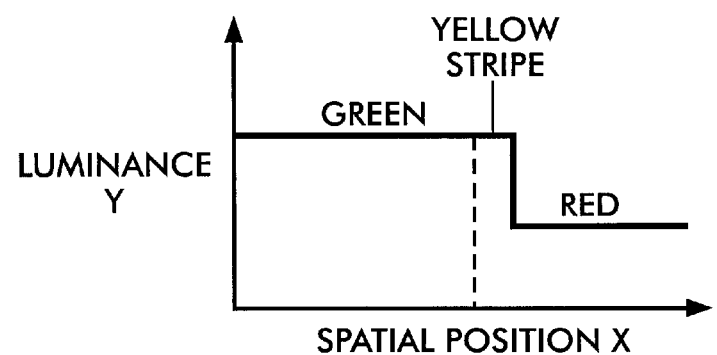
Figure 4:
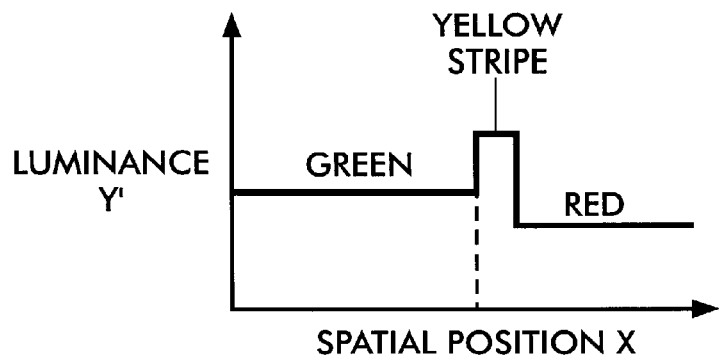
Figure 5:
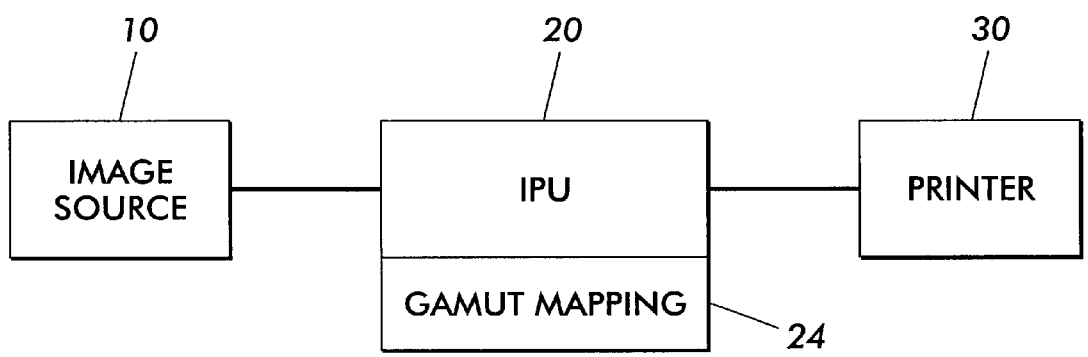
FIG. 5 illustrates a printing system in which the present invention finds advantage.

Referring now to the drawings where the showings are for the purpose of illustrating an embodiment of the invention and not for limiting same, a basic system for carrying out the present invention is shown in FIG. 5. In such a system, a source of original images 10, perhaps a color scanner, a personal computer or workstation with appropriate document or image creation software, a camera or data storage device, produces an image, typically in a device independent manner provides suitable electronic images. The images are defined in pixels, each associated with a color defined in terms of CIE color space $L^*, a^*, b^*$, or some other luminance-chrominance space (L, C1,C2) or an analytic transform thereof.

An image from image data source 10 is directed to an image processing unit (IPU) 20, which, for the purposes of description includes all of the digital processing requirements to convert an image from its original data representation to a format suitable for printing at printer 30. Depending on the image representation, image decomposition from a PDL, halftoning from gray level images, color transforms, scaling and any other process required, is represented by the IPU 20. IPU 20 can take various forms and operational details, and ranges from dedicated, and hardwired or software driven operation in conjunction with high speed printing devices, to printer drivers running on personal computers or workstations driving personal printers. Called out particularly is the gamut mapping function 24, which will be further described below. It will no doubt be appreciated that the colors may be derived in rgb color space, and readily converted to other device independent color spaces where calculations can more readily be performed. This may readily be part of the functionality of IPU 20.

Printer 30 can be any color printer, printing a plurality of separations which, when superimposed, form a multicolor image. For the purposes of the present invention and its description, the printer functionality could be replaced or arranged in parallel with a display or monitor.

Gamut mapping function 24 serves to map pixels defined by colors not printable by the printer, or resulting from initial image processing, into colors printable by the real printer. In doing so, out-of-gamut, unprintable colors are mapped to printable colors in accordance with some scheme that attempts to optimize retention of the color relationships within the document. Colors that fall within the output gamut may also be adjusted to retain the relationships to the mapped colors.

When referring to colorimetric or device independent spaces, the reference is to color space definitions that are transforms of CIE XYZ space (1931). When we refer to device dependent space, we refer to a color space that is defined only in terms of operation of the device using it. While many color spaces have three dimensions, it is possible to have color spaces with less than three dimensions or more than three dimensions and likewise, it is possible for printers to use less than three colorants or more than four colorants.

In the following discussion, the term "luminance" is used generically to encompass the strict definitions of luminance (i.e., the Y component in XYZ) and lightness (i.e. the L* component in L*a*b*). Chrominance components C1 and C2 are likewise generic manifestations of opponent color signals, or the equivalent polar representations, chroma and hue. It should understood that exact input luminance values cannot always be preserved through the gamut mapping, since this can result in undesirable trade-offs in the other attributes, hue and chroma. The optimum trade-offs in these attributes for various combinations of device gamuts, image types, and rendering intents is not the focus of the invention, and not discussed in detail here.

Figure 6:
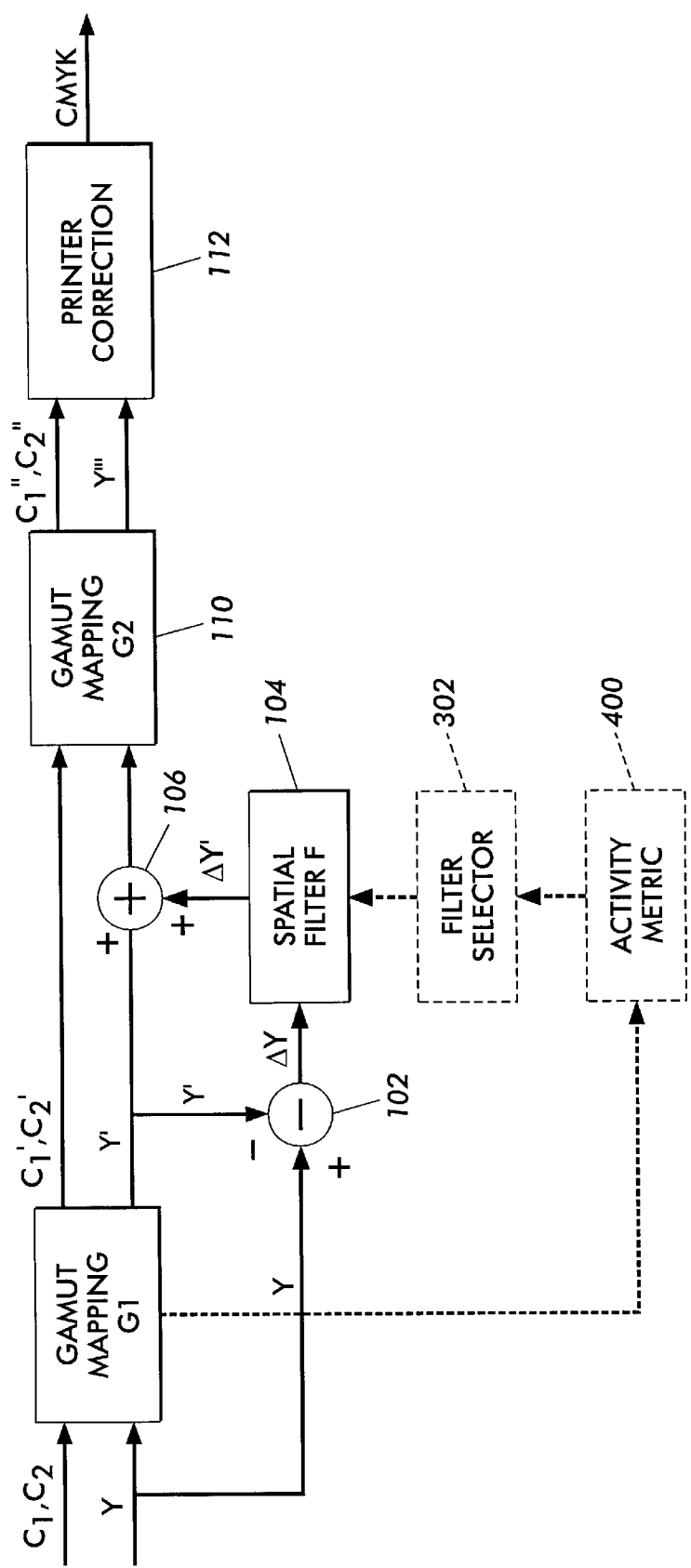
FIG. 6 illustrates a functional block diagram illustrating one embodiment of the present invention, which may be used in conjunction with the printing system of FIG. 5.

Initially, it will be assumed that a gamut mapping function G1 is a reasonable pixelwise strategy for large color patches or smooth regions of an image. The invention preserves the characteristics of G1 at low spatial frequencies, while preserving high frequency luminance variations in the original image that G1 may have lost or altered. The second gamut mapping G2 is designed to approximately preserve these luminance variations. With reference now to FIG. 6, an image defined, for example in Y (luminance), C1, C2 (chrominance space) is originally received and analyzed at gamut mapping function 100, which applies function G1 thereto.

As noted, function G1 can be any gamut mapping function, perhaps represented by either an optimized non-linear function, or a simplistic mapping function, where out of gamut pixels are moved to the nearest "in gamut" plane. There are many such functions, and the precise function chosen is not relevant to the invention. The output from the function could be characterized as Y', C1', C2'. From this output, the luminance signal Y' is compared to Y, perhaps in a simple differencing function, 102, producing $\Delta Y$. In general, the other color channels could also be included in the differencing operation. A spatial filter 104 operating on an n x m block of values $\Delta Y$ is used so that the feedback to the gamut mapping function is based on a local area, rather than derived on a pixel by pixel basis. The output of spatial filter 104, $\Delta Y'$, is then used to vary Y' to obtain Y". In this example, $\Delta Y'$ is added to Y' at adder 106. The colors defined by Y", C1', C2' are then subjected to a second gamut mapping function 110, implementing gamut mapping function G2, which may or may not be the same function as G1. The resulting signals are directed on to printer correction function 112, for conversion to device dependent signals preparatory to printing. G1 and G2 may be provided as described in R. S. Gentile, E. Walowit, and J. P. Allebach, *A Comparison of Techniques for Color Gamut Mismatch Compensation*, SPSE/SPIE Symposium on Electronic Imaging, Los Angeles, pp. 176–181; and E. G. Pariser, *An Investigation of Color Gamut Reduction Techniques*, IS&T 2nd Symposium on Electronic Publishing, pp. 105–107, 1991.

Considering possible gamut mapping functions, several are possible and useful in the present application. The design of gamut mapping functions G1 and G2, and the spatial filter 104 can depend on many factors, including global and local image characteristics, device characteristics, rendering intent and preference.

In one possible embodiment, gamut mapping function G1 was chosen to map out-of-gamut colors to the nearest surface point of the same hue, and G2 was chosen to map out-of-gamut colors to a surface point defined by the four steps: I) determine a hue of given out-of-gamut color; ii) calculate cusp point defined as the in-gamut color of maximum chroma at the given hue; iii) determine focal point by projecting the cusp point onto neutral axis while preserving luminance; and iii) mapping the out-of-gamut color to surface in a direction towards the focal point. In this embodiment, for both G1 and G2, in-gamut colors were unaltered. The filter F was chosen to be a linear filter with support over an NxN image block, designed so that at low frequencies, $\Delta Y'=0$, while at high frequencies, $\Delta Y'=\Delta Y$. This is essentially a high pass filter. With these characteristics, the inventive gamut mapping process will approximately reproduce the variations in Y at high spatial frequencies, while reducing to the pixelwise mapping G1 at low spatial frequencies.

The examples illustrate where it is desirable to change the colors predicted by traditional gamut mapping in order to preserve information from the original image. In each case, the output color or colors selected by the proposed algorithm would have been different if the colors were large areas of solid colors. The desire in color reproduction of images is not to reproduce the closest colors to the original, but to reproduce the information and intent of the original.

Figure 7:
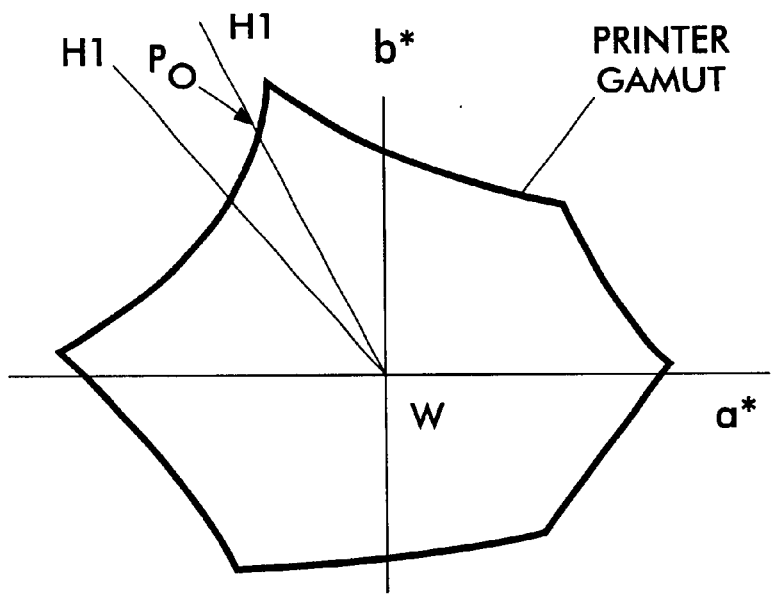
FIG. 7 illustrates a soft hue preserving gamut mapping method useful as a gamut mapping technique.

Other gamut mapping methods include:

With reference to FIG. 7, for a given input color, the hue angle thereof is obtained, and then the input color is mapped to the nearest point on the gamut surface within a range of hues about the input hue angle, where the range is greater than 0 and less than 90 degrees. A given point P, with hue angle H, is mapped to the closest point on the gamut surface within the region bounded by the lines W-H1 and W-H2.

Figure 8:
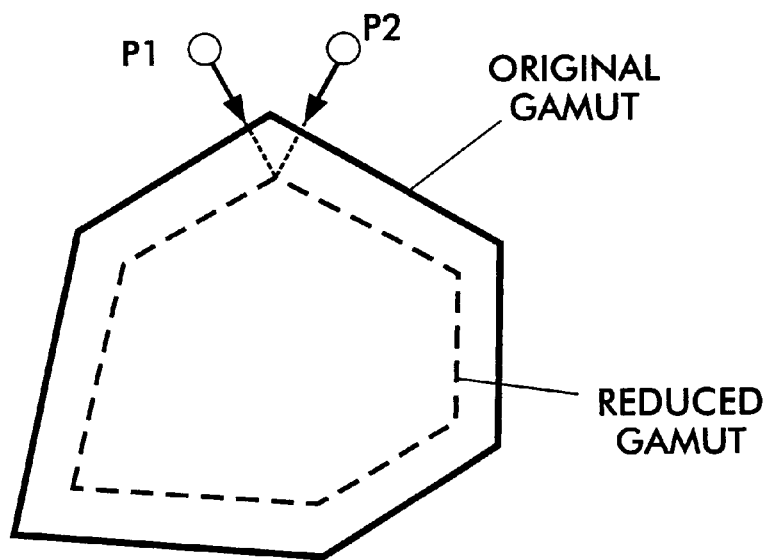
FIG. 8 illustrates a nearest point gamut mapping useful as a gamut mapping technique.

With reference to FIG. 8, a reduced gamut is defined by reducing the chroma of each surface point by a predetermined scale factor. For a given input color, a gamut-mapping vector is defined as the shortest distance to the reduced gamut. Map the input color to the original gamut surface in the direction given by this vector.

Figure 9:
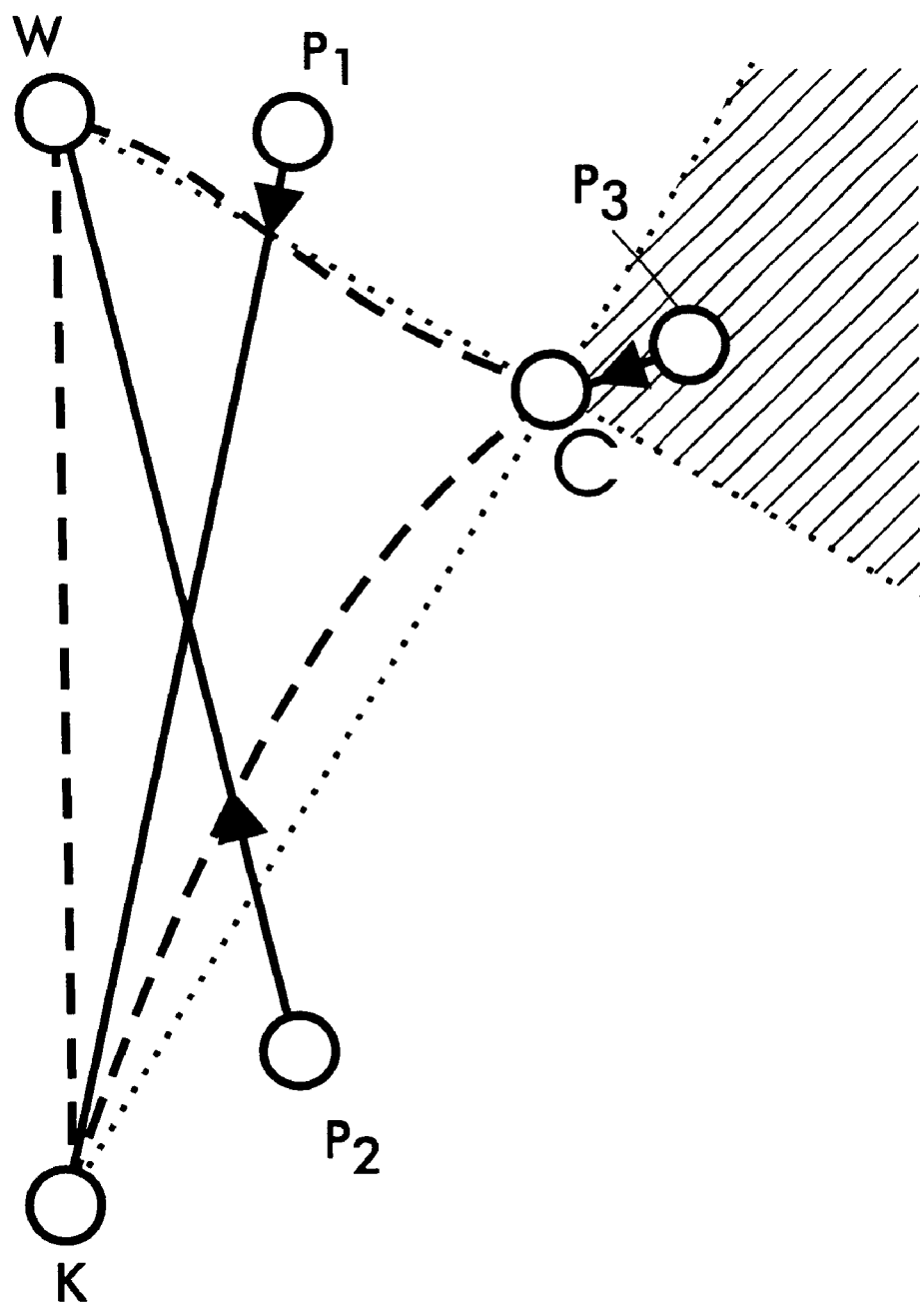
FIG. 9 illustrates a gamut mapping method moving the remapped points towards the provides gamut mapping towards printer black and white.
Figure 10:
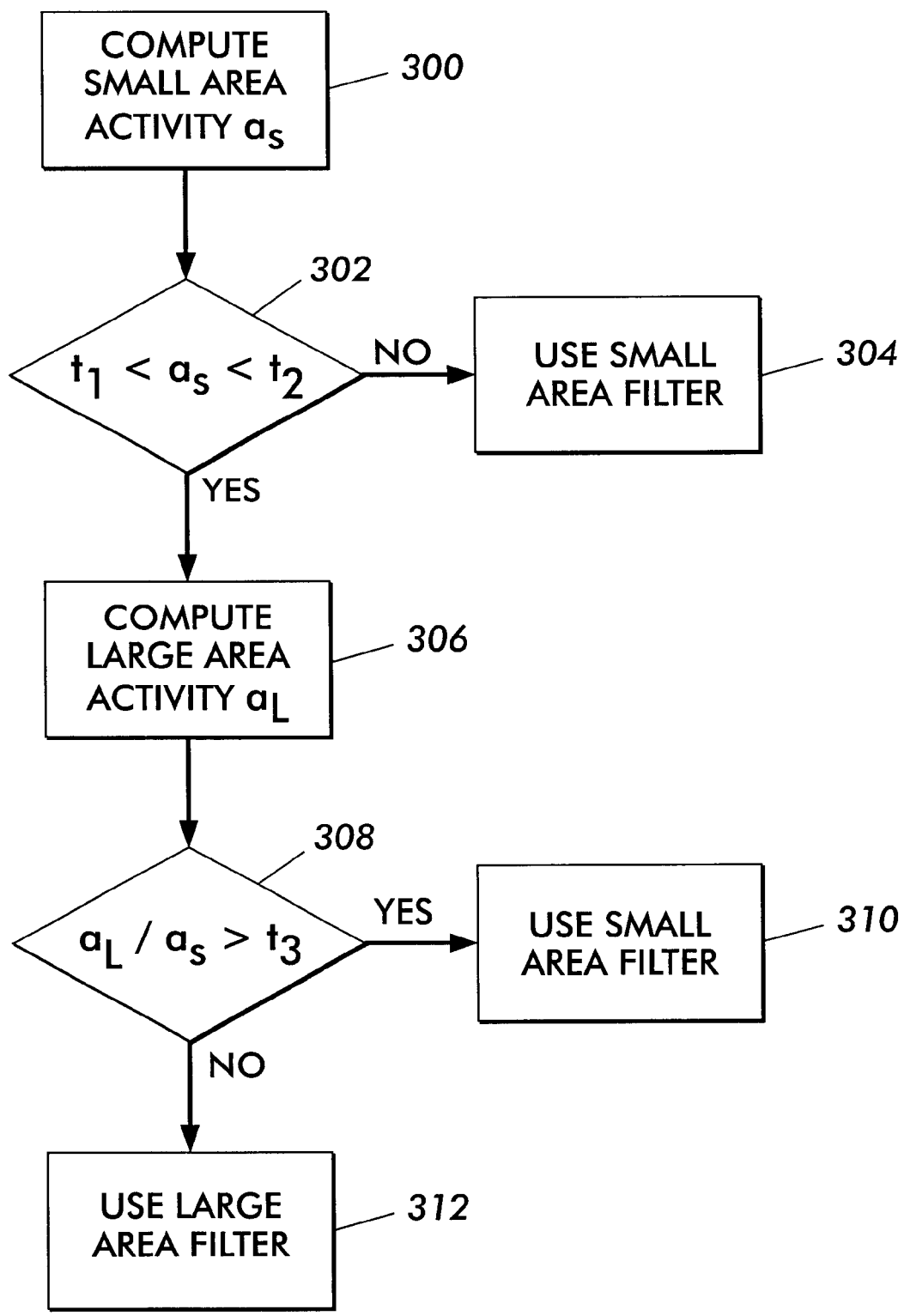
FIG. 10 is a flow-chart illustrating the operation of a linear adaptive spatial filter useful in conjunction with the invention.

With reference to FIG. 9, Point C is defined as the point of maximum chroma in the hue plane of the input color. Drawing two lines, WC from white to C, and KC from black to C. All points in the shaded region (e.g. P3) are mapped to point C. All points outside the shaded region whose lightness is greater than that of C (e.g. P1), are mapped to the surface in a direction towards black K. All points outside the shaded region whose lightness is less than that of C (e.g., P2), are mapped to the surface in a direction towards white W.

Again referring to FIG. 6, the process applies pixelwise gamut mapping G1 to the input colors, and computes a difference image $\Delta Y$ between the luminances of the input and gamut mapped signals. It then adds a filtered version $\Delta Y'$ of this difference back to the gamut mapped signal Y'. This operation might move pixels back out of the gamut, and hence, a second gamut mapping operation G2 is needed to ensure that all colors are within gamut. Note that G1 and G2 need not be the same algorithm.

With reference now to FIG. 6 and spatial filter 104, one possible filter that finds use with respect to the invention is an adaptive linear filter. Using the above gamut mapping process, it can be seen that pictorial images require a large filter footprint in order to have a visual effect. Here "large" refers to roughly 15 to 30 pixels (1-dimensional) for a 300 dpi (dot per inch) printer. Smaller filters are not as effective.

Note that in general, it may be desirable to choose F as a nonlinear filter. The simple linear filter was chosen for ease of demonstration. It should also be noted that the filter can optionally have a gain larger than 1 to enhance detail.

On graphical data, however, large filter sizes lead to a distinct and disturbing halo effect around edges. This effect is especially disturbing for text on a colored background. Consequently small filter windows or footprints should be used. When the wrong filter size is used, image quality improvement may not be obtained.

The filter can be adapted to improve its use by changing the filter footprint as a function of the local image data. In this way, the filter function adapts to local image content. It should be noted that one could also change the filter values or coefficients (rather than the footprint). However, variation of the filter footprint is a preferred option, because a fast implementation exists for a simple, constant-weight blur filter.

One way of looking at the filter selection issue can be described in the framework of pictorial vs. graphic data. A closer examination, however, reveals that the issue is connected to the local image data variation in terms of local activity and "noise". Clean edges in the input image data are best mapped using a smaller filter footprint. Noisy and weak edges are best mapped using a large filter footprint. A significant improvement is obtained by using different filter footprints based on local image characteristic. Different local image activity measures can be used, but they all have in common that:

a) Very low activity [flat areas] correspond to a small filter footprint (=1; 5×5 footprint, for example).
b) Medium activity [mild image variations] correspond to a large filter footprint (15×15 footprint, for example).
c) High activity [strong edges] correspond to a small filter footprint (>1; 5×5 footprint, for example).

The most obvious metric is data norm of order p:

$$a_i = \|e_i\|_p$$

Here, $e_i$ is the luminance error at the center pixel i and $e_j$ is the luminance error at pixel j within the predefined neighborhood of pixel i. The most common forms of this activity measure are:

$$a_i^{L1} = \sum_j |e_i - e_j| \quad \text{and} \quad a_i^{L2} = \left[\sum_j (e_i^2 - e_j^2)\right]^{\frac{1}{2}}$$

For speed of implementation, we are using a modified activity measure:

$$a_i = \frac{1}{m}\left|\sum_j (e_i - e_j)\right|.$$

The advantage of the above activity measure lies in the fact that the quantity used as activity is already computed as part of the standard filtering described.

The described filtering function may be implemented by generating an activity metric at activity metric function 400, which applies its output to filter selector 302, to select an appropriate filter for spatial filter 104.

FIG. 7 shows a flowchart of the adaptive filtering method. At step 300, a small area activity metric as is computed, conveniently using the absolute value of the small area filter calculation. At step 302, if the small area activity $a_s$ falls outside a medium range, the small area filter is used (step 304). If $a_s$ falls within the range, a large area activity $a_L$ is computed at step 306, again conveniently using the absolute value of the large area filter calculation. At step 308, values of the activity metrics are compared. If the ratio of the two activity metrics $a_s/a_L$ is larger than a specified threshold $T_3$, a small filter is used at step 310; otherwise a large filter is used at step 312. It should be noted that re-normalization constants in the activity metrics based on the filter size have been omitted.

The required filters vary with the object or image type of the input, but simple activity measures as described above are sufficient to select the appropriate filters. It should be clear that the selection between two discrete filters was chosen for simplicity and speed and that in the general case the activity measure can be used to derive a filter or to smoothly blend between a number of pre-selected filters.

It Will no doubt be appreciated that the present invention can be accomplished through application software accomplishing the functions described, to operate a digital computer or microprocessor, though a hardware circuit, which will probably provide optimum speed, or though some combination of software and hardware.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method o remapping colors in an original document, preparatory to use in a system having a different system gamut, comprising the steps of:

receiving a set of pixels deferring at least a portion of an Image, each pixel associated with an original pixel color;

for any pixel in said set of pixels, remapping said pixel from said original pixel color to a new pixel color within said system gamut;

comparing original pixel color in said set of pixels with new pixel colors in said set of pixels and creating a Comparison metric therefrom, wherein said comparison metric is a difference between an original pixel color luminance component and a new pixel color luminance;

processing said comparison metric through a spatial filtering operation; and combining an output of said spatial filtering operation with said new pixel colors.

2. A method as described in claim 1, wherein said remapping is accomplished by remapping each pixel from said original pixel color to said new pixel color, said new pixel color emphasizing preservation of chroma or saturation over preservation of lightness of the pixel.

3. A method as Described in claim 1 where said combining adds an output of said spatial filtering to said new pixel color luminance component.

4. A method as described in claim 1 where said spatial filtering uses a linear filter.

5. A method as described in claim 1 wherein said spatial filtering strengthens said comparison metric in high spatial frequency regions to increase the effect thereof on new pixel colors, and weakens said comparison metric in low spatial frequency regions to weaken the effect thereof on new pixel colors.

6. A method as described in claim 1, further comprising an additional remapping of said set of pixels associated with new pixel colors to adjusted new pixel colors, where said combining has moved said new pixel colors out of said system gamut.

7. A method as described in claim 6, wherein said additional remapping comprises:
   determining a hue of each said new pixel color;
   calculating a cusp point, defined as a point on a printer gamut surface corresponding to a maximum achievable chroma for said hue;
   determining a focal point, defined as a projection of said cusp point into a neutral axis of a color space, in a manner that preserves luminance; and
   mapping pixel colors that are out of said system gamut to said adjusted new color on a surface of said system gamut in a direction in said color space towards said focal point.

8. A method of remapping colors in an original document, preparatory to use in la system having a different system gamut than originally applied, including:
   receiving a set of pixels defining at least a portion of an image, each pixel therein mapped to a first set of original colors.
   for each pixel in said set, remapping said pixel from said set of original colors to a new set of colors within said system gamut;
   determining a comparison metric, comparing said set of pixels mapped to said first set of original colors and said set of pixels mapped to said new set of colors, wherein said comparison metric is a difference between luminance values of said set of pixels mapped to said first set of original colors and said set of pixels mapped to said new set of colors; and
   applying said comparison metric to said colors after remapping to provide corrective spatial feedback to said pixel set to adjust color selection within said system gamut.

9. The method as defined in claim 8, and including filtering said comparison metric prior to corrective feedback.

10. The method as defined in claim 8, wherein said filtering is provided by a linear filter.

11. The method as defined in claim 8, wherein said linear filter strengthens said comparison metric in high spatial frequency regions, to increase the effect thereof on said new set of colors, and weakens said comparison metric in low spatial frequency regions, to weaken the effect thereof on new set of colors.

12. The method as defined in claim 8, wherein said filtering is provided by a non-linear filter.

13. The method as defined in claim 8, and including an additional remapping of said pixels to said new set of colors, to correct any mappings where said corrective feedback has moved said new color out of said system gamut.

14. A gamut mapping system, including:
   an image: input, receiving pixels directed thereto mapped to a first set of colors, which may not be reproducible at a selected output device; and
   a first gamut mapping device, remapping said pixels mapped to said first set of colors to a second set of colors reproducible at said selected output device;
   a corrective spatial feedback system, having:
      a first input receiving said pixels mapped to said first set of colors,
      a second input receiving said pixels mapped to said second set of colors, and producing a comparison signal representing a difference therebetween, said difference being between an original pixel color luminance component and a new pixel color luminance; and
   a signal ladder, adding said comparison signal to a luminance value of said pixels mapped to said second set of colors, to adjust said luminance values, while maintaining other color defining values.

15. A gamut mapping system as defined in claim 14, and including:
   a spatial filter, operating on said comparison signal before it added to said luminance value of said pixels mapped to said second set of colors, said spatial filter strengthens said comparison metric in high spatial frequency regions, to increase the effect thereof on said new set of colors, and weakens said comparison metric in low spatial frequency regions, to weaken the effect thereof on new set of colors.

16. A gamut mapping system as defined in claim 14, and including
   a second gamut mapping device, remapping said pixels mapped to said second set of colors, after said comparison signal is added thereto, to assure said pixels mapped to said second set of colors are reproducible at said selected output device.

* * * * *